United States Patent
Naito et al.

(10) Patent No.: US 6,752,226 B2
(45) Date of Patent: Jun. 22, 2004

(54) SYSTEM FOR DRIVING HYBRID VEHICLE, METHOD THEREOF AND ELECTRIC POWER SUPPLY SYSTEM THEREFOR

(75) Inventors: Shotaro Naito, Hitachinaka (JP); Hiroshi Katada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 10 days.

(21) Appl. No.: 10/404,107

(22) Filed: Apr. 2, 2003

(65) Prior Publication Data

US 2003/0183430 A1 Oct. 2, 2003

Related U.S. Application Data

(63) Continuation of application No. 09/407,989, filed on Sep. 29, 1999.

(30) Foreign Application Priority Data

Sep. 29, 1998 (JP) .......................................... 10-275003
Sep. 29, 1998 (JP) .......................................... 10-275004

(51) Int. Cl.$^7$ .............................................. B60L 11/06
(52) U.S. Cl. ........................ 180/65.3; 701/22; 318/140; 307/44
(58) Field of Search .............................. 180/65.2, 65.3, 180/65.1, 65.4, 65.8; 701/22; 318/139, 140; 323/266, 273, 275; 307/44, 10.1, 10.7; 320/103, 104, 145, 162

(56) References Cited

U.S. PATENT DOCUMENTS

| | | | | | |
|---|---|---|---|---|---|
| 611,775 | A | * | 9/1898 | Chung et al. | 307/10.1 |
| 4,269,280 | A | * | 5/1981 | Rosen | 180/65.2 |

(List continued on next page.)

FOREIGN PATENT DOCUMENTS

| JP | 07-042647 | 2/1995 |
|---|---|---|
| JP | 07-293215 | 11/1995 |
| JP | 08-009510 | 1/1996 |
| JP | 08-061110 | 3/1996 |
| JP | 08-121203 | 5/1996 |
| JP | 8-512172 | 12/1996 |
| JP | 09-039613 | 2/1997 |
| JP | 09-056007 | 2/1997 |
| JP | 10-075502 | 3/1998 |
| JP | 10-089115 | 4/1998 |

OTHER PUBLICATIONS

ISAD–A Computer Controlled Integrated Starter–Alternator–Damper–System, Klaus–Peter Zeyen and Pels (JSDA Electronic Systems GmbH & Co., KG, SAE Paper 972660.

*Primary Examiner*—Brian L. Johnson
*Assistant Examiner*—Jeffrey J Restifo
(74) *Attorney, Agent, or Firm*—Crowell & Moring LLP

(57) ABSTRACT

A system for driving a hybrid vehicle having an engine, a motor/generator, a battery and a controller for the engine and the motor/generator. The controller has a plurality of operating modes. In an engine running electric generating mode, the engine is operated as a driving source of the vehicle and the motor/generator and electric power generated by the motor/generator is recovered to the battery when the charge ratio is low. In an acceleration mode, the engine and the motor/generator are operated as the driving source of the vehicle when the charge ratio of the battery is high, and the accelerator opening degree or a rate of change of the accelerator opening degree is large. In an engine running mode only the engine is operate as the driving source of the vehicle when the charge ratio of the battery is high and the accelerator opening degree is small.

1 Claim, 8 Drawing Sheets

U.S. PATENT DOCUMENTS

| | | | | |
|---|---|---|---|---|
| 5,343,970 A | * | 9/1994 | Severinsky | 180/65.2 |
| 5,381,297 A | | 1/1995 | Weber | |
| 5,537,960 A | | 7/1996 | Izuo et al. | |
| 5,697,466 A | * | 12/1997 | Moroto et al. | 180/65.2 |
| 5,785,138 A | * | 7/1998 | Yoshida | 180/65.2 |
| 5,823,280 A | * | 10/1998 | Lateur et al. | 180/65.2 |
| 5,832,396 A | * | 11/1998 | Moroto et al. | 180/65.2 |
| 5,929,595 A | * | 7/1999 | Lyons et al. | 320/104 |
| 5,929,609 A | * | 7/1999 | Joy et al. | 322/25 |
| 5,969,624 A | * | 10/1999 | Sakai et al. | 340/636.1 |
| 6,003,626 A | * | 12/1999 | Ibaraki et al. | 180/65.2 |
| 6,116,363 A | * | 9/2000 | Frank | 180/65.2 |
| 6,116,368 A | * | 9/2000 | Lyons et al. | 180/65.2 |
| 6,133,707 A | * | 10/2000 | Kikuchi et al. | 320/104 |
| 6,164,400 A | * | 12/2000 | Jankovic et al. | 180/65.2 |
| 6,173,569 B1 | * | 1/2001 | Kusada et al. | 60/277 |
| 6,204,636 B1 | * | 3/2001 | Kinoshita et al. | 320/134 |
| 6,232,744 B1 | * | 5/2001 | Kawai et al. | 320/132 |
| 6,314,346 B1 | * | 11/2001 | Kitajima et al. | 701/22 |
| 6,335,574 B1 | * | 1/2002 | Ochiai et al. | 290/40 C |
| 6,362,580 B1 | * | 3/2002 | Omata et al. | 318/139 |
| 6,401,850 B1 | * | 6/2002 | Bowen | 180/65.6 |
| 6,428,444 B1 | * | 8/2002 | Tabata | 477/3 |
| 6,429,613 B2 | * | 8/2002 | Yanase et al. | 318/139 |
| 6,443,126 B1 | * | 9/2002 | Morimoto et al. | 123/339 |
| 6,476,571 B1 | * | 11/2002 | Sasaki | 318/139 |
| 6,563,230 B2 | * | 5/2003 | Nada | 290/40 C |
| 6,583,592 B2 | * | 6/2003 | Omata et al. | 318/139 |
| 6,583,599 B1 | * | 6/2003 | Phillips et al. | 320/104 |

* cited by examiner $\alpha = f(V_{BS}, V_{BM})$

SYSTEM FOR DRIVING HYBRID VEHICLE, METHOD THEREOF AND ELECTRIC POWER SUPPLY SYSTEM THEREFOR

BACKGROUND OF THE INVENTION

The present invention relates to a system for driving a hybrid vehicle using both of a motor and a motor/generator as the drive sources, and a method of driving the hybrid vehicle, and an electric power supply system for the hybrid vehicle.

As disclosed in Japanese Patent Application Laid-Open No. 9-65508, it is known a hybrid vehicle which generates electric power by driving an engine generator and runs by driving a vehicle driving motor using the generated electric power.

In a conventional hybrid vehicle, reduction of fuel consumption and cleaning of exhaust gas are performed by appropriately switching the drive sources corresponding to the running condition, that is, by using motor drive when exhaust gas becomes a problem, for example, when the hybrid vehicle is started or accelerated. In addition, it is an effective method for reducing exhaust gas to stop operation of the engine at an idling period.

However, the hybrid vehicle still has problems to be solved in order to extend the running distance by storing sufficient electric power in the battery and to keep good operating characteristics.

In a hybrid vehicle which reduces an amount of harmful exhaust gases by stopping idling operation of the engine when the vehicle is temporarily stopped for purpose of emission control, for example, at waiting for traffic light change, when the engine is restarted after once stopping operation of the engine, the engine can not be smoothly restarted to perform acceleration running if sufficient electric power is not stored in the battery. Further, if the environmental condition such as cooling water temperature of the engine is not within an appropriate range at temporarily stopping the vehicle, there are some cases where the engine can not be smoothly restarted just after that.

Further, the conventional hybrid vehicle uses a high voltage main battery, for example, a 120 V battery, because the vehicle driving motor requires large output. The hybrid vehicle also comprises, for example, a 12 V auxiliary battery as the power source for the engine, the other auxiliary machines, a lighting system, an air-conditioner and so on. Wiring of the main battery needs to have a dedicated ground in order to prevent a human body from electric shock because of the high voltage of 120 V. As a result, the wiring systems of the both electric power sources of the main battery and the auxiliary battery become complex. On the other hand, when the voltage of the power source of the main battery is simply lowered, it is worried that the outputs of the motor and the generator are decreased.

SUMMARY OF THE INVENTION

A first object of the present invention is to provide a system for driving a hybrid vehicle and a method of driving the hybrid vehicle which can store sufficient electric power in a battery and is excellent in the operating characteristic by solving the above-mentioned problems.

A second object of the present invention is to provide a system for driving a hybrid vehicle and a method of driving the hybrid vehicle which can smoothly restart the engine or perform acceleration running after stopping idling operation of the engine in a case where an amount of harmful exhaust gases is reduced at temporarily stopping of the vehicle by stopping idling operation of the engine for purpose of emission control.

A third object of the present invention is to provide a safe and simplified electric power supply system for the hybrid vehicle by solving the above-mentioned problems.

A fourth object of the present invention is to provide an electric power supply system for the hybrid vehicle which can improve not only operating characteristics of the motor and the generator but also operating characteristics of the engine such as the acceleration performance.

In order to attain the first and the second objects, the present invention is characterized by a system for driving a hybrid vehicle comprising an engine; a motor/generator coupled to the engine; a battery connected to the motor/generator through an electric power converter; and a controller for controlling the engine and the motor/generator corresponding to driving condition of the vehicle, wherein the controller has a plurality of operating modes for controlling the engine and the motor/generator corresponding to an accelerator opening degree for operating the engine and a charge ratio of the battery, and the controller selects an engine running electric generating mode that the engine is operated as a driving source of the vehicle and the motor/generator and electric power generated by the motor/generator is recovered to the battery when the charge ratio is low; an acceleration mode that the engine and the motor/generator are operated as the driving source of the vehicle when the charge ratio of the battery is high, and the accelerator opening degree or a rate of change of the accelerator opening degree is large; and an engine running mode that only the engine is operated as the driving source of the vehicle when the charge ratio of the battery is high and the accelerator opening degree is small.

Another feature of the present invention is that the controller stops the engine to operate as an engine stop mode when a key-switch is on, an accelerator is off and a speed of the vehicle is slower than a preset value, and the charge ratio is higher than a preset value.

A further feature of the present invention is that the controller selects the engine stop mode when in addition to the stop condition described above, an engine cooling water temperature is higher than a preset value TS and an inclining angle of the vehicle in a stopping state is smaller than a preset value $\theta$.

The present invention is characterized by a method of driving a hybrid vehicle comprising an engine; a motor/generator coupled to the engine; a battery connected to the motor/generator through an electric power converter; and a controller for controlling the engine and the motor/generator corresponding to driving condition of the vehicle, wherein an engine running electric generating mode is selected when the charge ratio is low, the engine running electric generating mode being that the engine is operated as a driving source of the vehicle and the motor/generator and electric power generated by the motor/generator is recovered to the battery; an acceleration mode is selected when the charge ratio of the battery is high, and the accelerator opening degree or a rate of change of the accelerator opening degree is large, the acceleration mode being that the engine and the motor/generator are operated as the driving source of the vehicle; and an engine running mode is selected when the charge ratio of the battery is high and the accelerator opening degree is small, the engine running mode being that only the engine is operated as the driving source of the vehicle.

According to the present invention, the operating characteristics of the hybrid vehicle such as reduction of fuel consumption, acceleration performance can be improved. Particularly, since idling operation of the engine is stopped under the preset condition when the accelerator is off even if the key-switch is on, it is possible to easily reduce an amount of harmful exhaust gases at temporarily stopping of the vehicle for purpose of emission control and to easily perform the driving operation for temporary stopping and then to restart the engine or perform smooth acceleration running.

In order to attain the third and the fourth objects, the present invention is characterized by an electric power supply system for a hybrid vehicle comprising an engine; a motor/generator coupled to the engine; a battery connected to the motor/generator through an electric power converter, the battery being composed of a main battery and an auxiliary battery, wherein the auxiliary battery is connected to the main battery through a switching element and controlled to a voltage lower than a voltage of the main battery, a ground line being commonly used by the main battery and the auxiliary battery, the auxiliary battery being charged from the main battery through the switching element depending on a charge ratio of the main battery when the main battery stores enough electric power.

Another feature of the present invention is that voltage of the main battery is not higher than 60 V, and voltage of the auxiliary battery is 12 V or 24 V.

A further feature of the present invention is that the main battery is used for an electric power source of electromagnetic coils for driving an injector and an intake and an exhaust valves of the engine.

According to the present invention, since the voltage of the main battery is set low, for example, below 60 V, and the ground line being commonly used by the main battery and the auxiliary battery, all the power source lines wired inside the vehicle are positive voltage lines and accordingly the electric power units of the hybrid vehicle can be simplified.

Further, since the high voltage main battery is used for the electric power source of electromagnetic coils for driving the injector and the intake and an exhaust valves of the engine, it is possible to provide a hybrid vehicle which can improve operating characteristics of the engine such as the acceleration performance by improving the operating response of these constituent parts of the engine.

DESCRIPTION OF THE PREFERRED EMBODIMENTS

Figure 1:
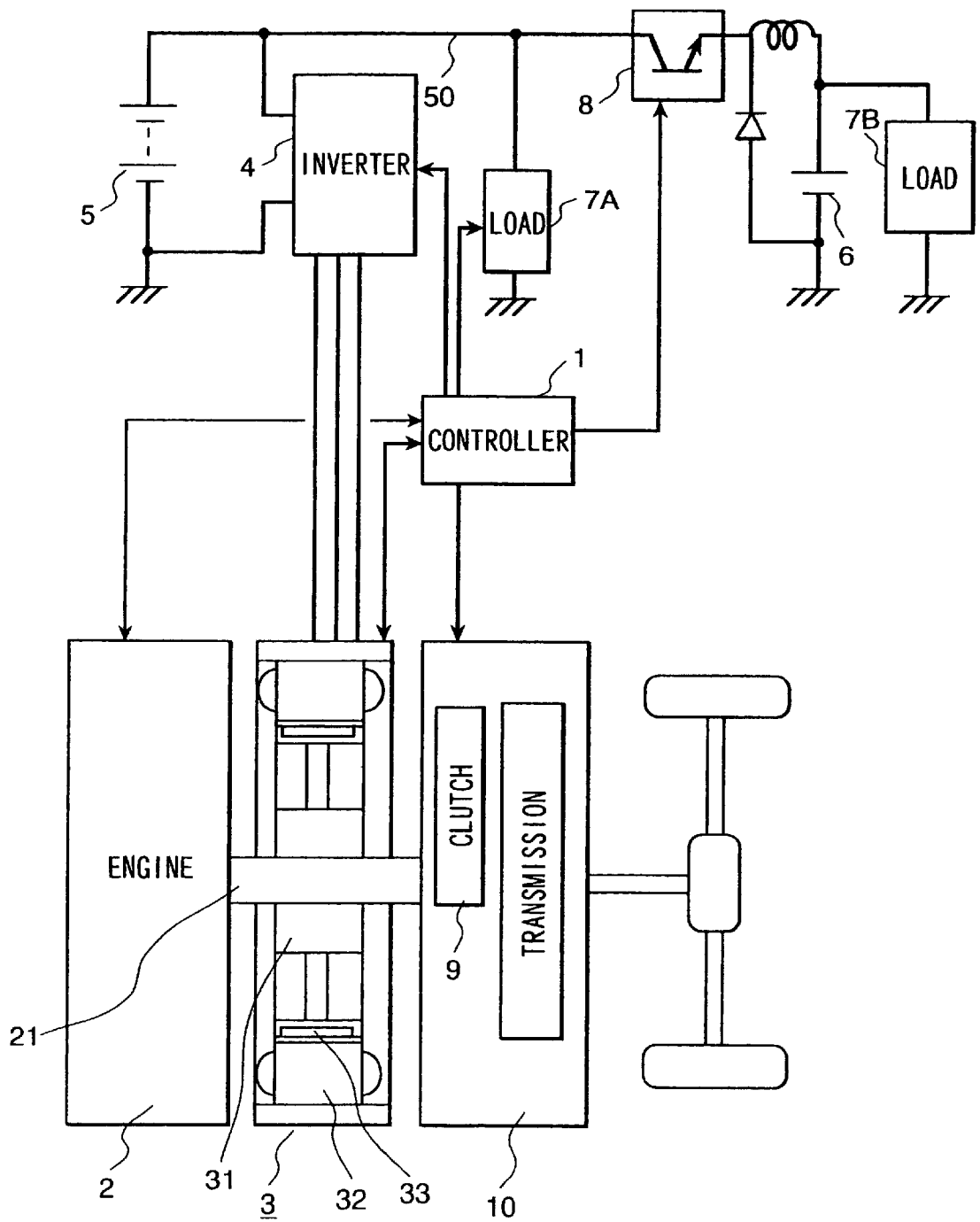
FIG. 1 is a diagram showing the overall construction of a first embodiment of a hybrid vehicle driving system in accordance with the present invention.

Embodiments of the present invention will be described below, referring to the accompanied drawings. FIG. 1 is a diagram showing the overall construction of a first embodiment of a hybrid vehicle driving system in accordance with the present invention. In FIG. 1, the reference character 1 indicates a controller which controls an engine 2 and a motor/generator 3 and so on corresponding to an operating condition of the vehicle. A clutch 9 is arranged between the motor/generator 3 and a transmission 10. In a case of using an automatic transmission mechanism, the clutch 9 is omitted. The motor/generator 3 receives electric power from a main battery 5 through an inverter 4, and electric power generated by the motor/generator 3 is charged to the main battery 5 in a preset voltage through the inverter 4. The reference character 7A indicates a load suitable for using a relatively high voltage electric power source, for example, an electromagnetic coil of an injector of the engine 2, electromagnetic valves for driving intake valves and exhaust valves and so on.

A rotor 31 of the motor/generator 3 is directly coupled to a crank shaft 21 of the engine 2. The reference character 32 indicates a stator of the motor/generator 3, and the reference character 33 indicates a magnet. The rotor 31 of the motor/generator 3 and the crank shaft 21 of the engine 2 may be coupled to each other through a power transmission mechanism such as a gear.

The reference character 6 indicates an auxiliary battery for supplying electric power to a load 7B such as lamp and so on, and the auxiliary battery is connected to the main battery 5 through a switching element (for example, an FET element) 8. The auxiliary battery 6 is charged from the main battery 5 by on-off controlling the switching element 8 with a frequency of approximately 100 kHz. The voltage of the main battery 5 is controlled to a value lower than 60 V and higher than voltage of the auxiliary battery 6, for example, controlled to 48 V or 36 V. By using the main battery 5 as the electric power source for the electromagnetic coil for driving the fuel injection valve of the engine 2, it is possible to improve the response of the fuel injection valve of the engine 2. On the other hand, the voltage of the auxiliary battery 6 is controlled to a value lower than the voltage of the main battery 5, for example, to 12 V or 24 V.

Since electric shock can be avoided due to the low voltage of the main battery, a negative (grand) line is commonly used for the main battery 5 and the auxiliary battery 6, and accordingly a special wire can be omitted. Therefore, the line between the main battery 5 and the auxiliary battery 6 through the switching element 8 is of the one-line type, and the main battery 5 and the auxiliary battery 6 are connected with only a positive line 50. However, it is possible to employ the two-line type that a positive line and a negative (ground) line are separately provided between the main battery 5 and the auxiliary battery 6.

The controller 1 controls operations of the engine 2 and the motor/generator 3 and so on corresponding to an operating condition of the vehicle and a charge condition of the main battery. Electric power generated by the motor/generator 3 and stored in the main battery 5 during running of the vehicle is used to drive the motor/generator 3 instead of the engine or as a power source assisting the engine when the vehicle is started to run or accelerated or when running power is insufficient. Further, the obtained electric power may be used for the lamps or the other auxiliary components. However, when the charged amount of the battery 5 is below a preset value, the electric power is not supplied to the auxiliary components.

Figure 2:
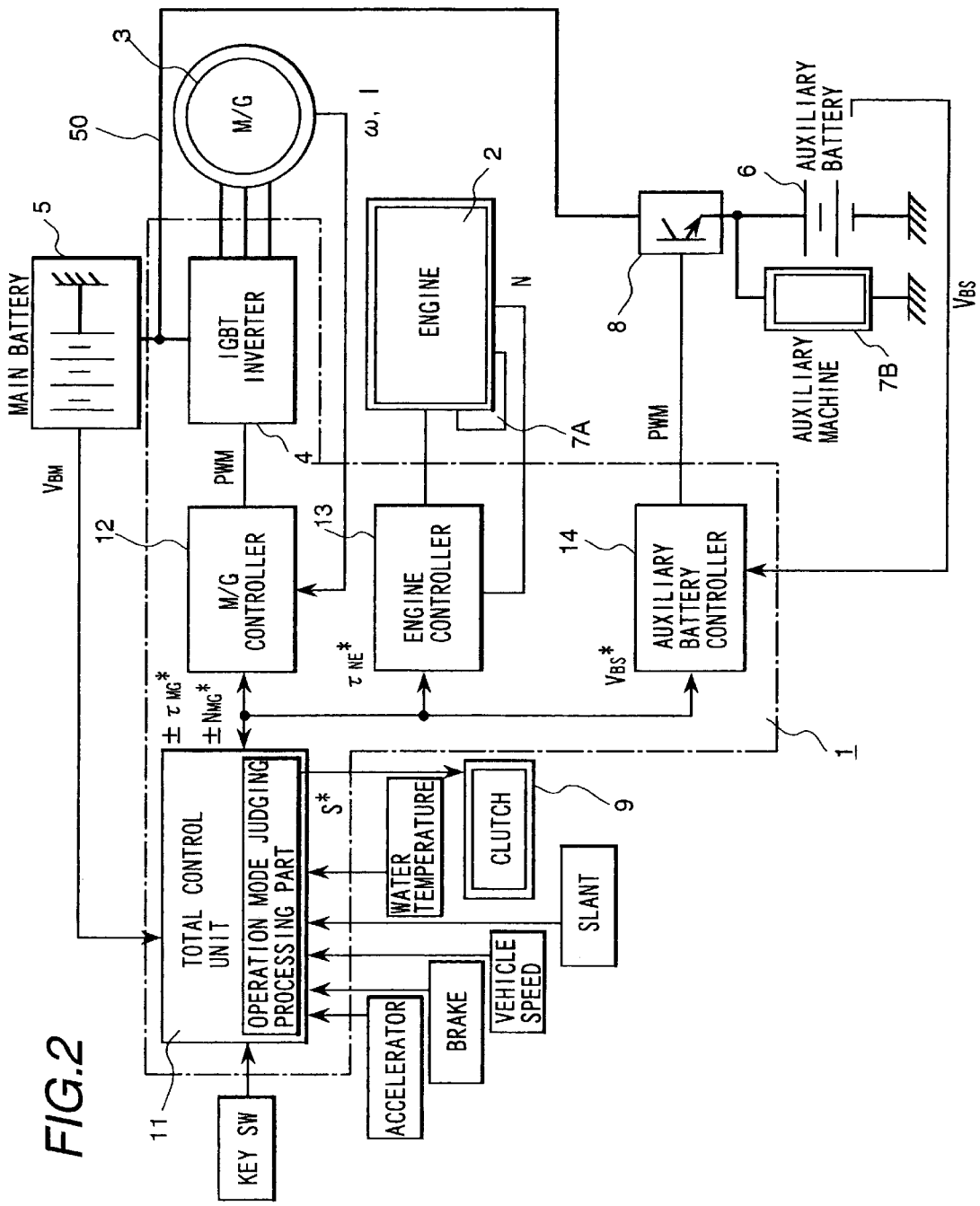
FIG. 2 is a block diagram showing an example of the detailed construction of the controller of FIG. 1.

FIG. 2 shows an example of the detailed construction of the controller 1. The controller 1 is composed of a total control unit 11, 1 motor/generator controller 12, an engine controller 13 and an auxiliary battery controller 14.

The total control unit 11 receives various kinds of information on a key-switch, a vehicle speed sensor, an inclining switch, a battery voltage sensor. The total control unit 11 judges the operation mode of the vehicle based on the information and calculates operation commands $N_{MG}*$, $\tau_{MG}*$, $\tau_{NE}*$, $V_{Bs}*$, S*, and outputs the operation commands to the motor/generator controller 12, the engine controller 13, the auxiliary battery controller 14 and the transmission 8, respectively.

The motor/generator controller 12 generates a PWM signal for controlling the inverter 4 from the operation commands $N_{MG}*$, $\tau_{MG}*$ and information on a rotation speed and current of the motor/generator 3 and outputs the PWM signal. The motor/generator serves as a motor when the operation command $\tau_{MG}*$ is positive, and as a generator when the operation command $\tau_{MG}*$ is negative.

The engine controller 13 controls an injection amount of fuel, ignition timing and opening and closing of the intake and the exhaust valves based on the operation command $\tau_{ME}*$ and an engine rotation speed N.

The auxiliary battery controller 14 generates and outputs a PWM signal so that the voltage of the auxiliary battery agrees with the command $V_{Bs}*$ to keep the charge ratio of the auxiliary battery to a preset vale by performing chopper control of the switching element.

Figure 3:
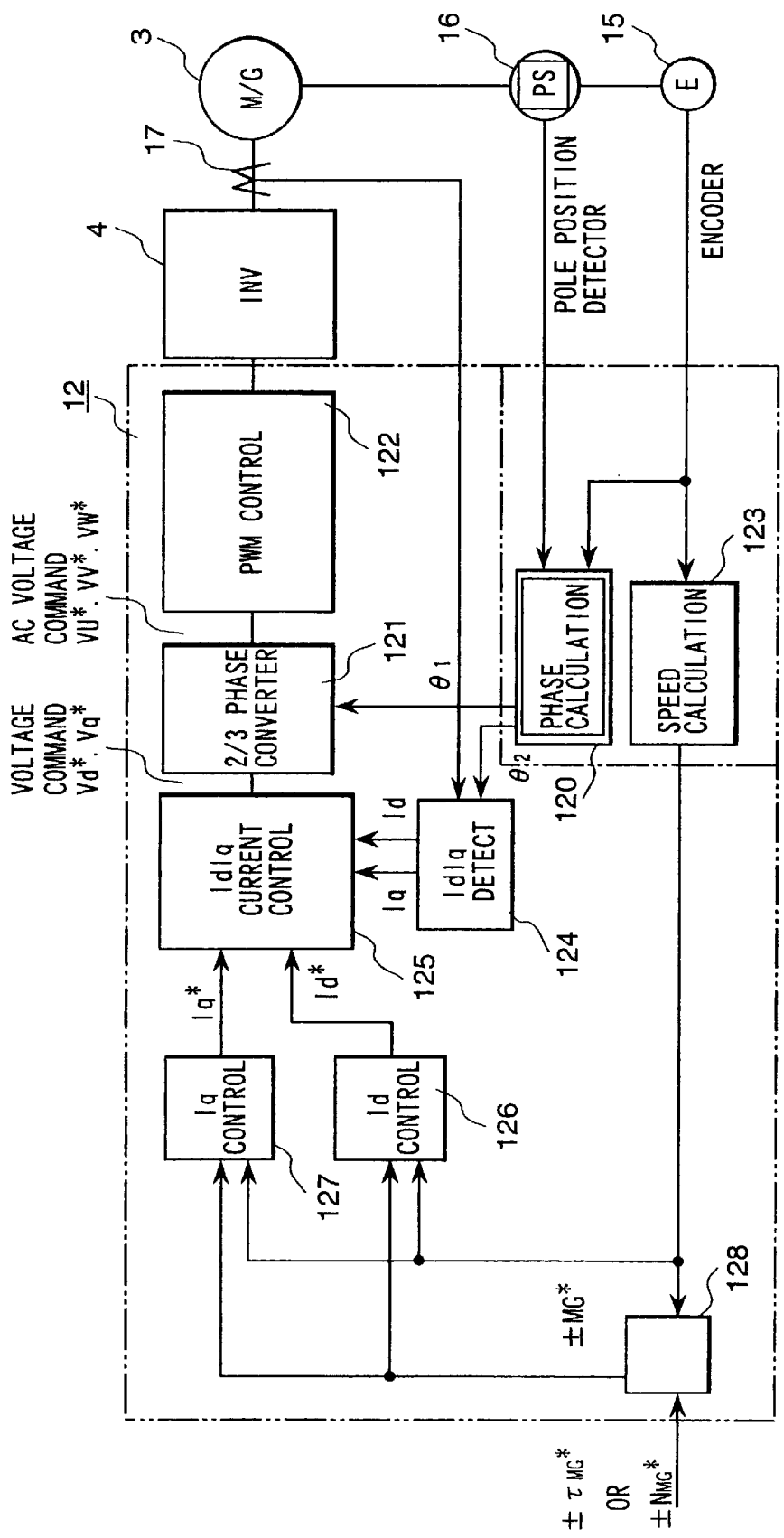
FIG. 3 is a block diagram showing an example of the detailed construction of the motor/generator controller of FIG. 2.

FIG. 3 shows an example of the detailed construction of the motor/generator controller 12. The motor/generator controller 12 comprises an IdIq detecting means 124, an IdIq current control means 125, a 2/3 phase converting means 121, a PWM control means 122, a phase calculating means 120 and a speed calculating means 123. The speed calculating means 123 is connected to an encoder 15, and the phase calculating means 120 is connected to a pole position detecting means 16. The motor/generator controller 12 further comprises a torque command generating part 128, an Iq control means 127 and an Id control means 126.

The operation command $N_{MG}*$ or a target torque command $\tau M_G*$ is input to the torque command generating part 128. When a rotating speed of the motor/generator needs to be accurately controlled to a preset value as at cranking the engine, the operation command $N_{MG}*$ directly instructing the rotating speed of the motor/generator $N_{MG}$ is input to the torque command generating part 128. When a preset torque needs to be generated in the motor/generator as at acceleration running, the target torque command $\tau M_G*$ is directly input. When the motor/generator is required to operate as the generator, a given value of the target command $\tau_{MG}*$ becomes negative.

When an operation command $N_{MG}*$ is input to the torque command generating part 128, the torque command generating part 128 calculates a torque command $\tau_{MG}*$ based on the operation command $N_{MG}*$ and a rotating speed calculated by the speed calculating means 123 using a pulse signal from the encoder 15. Based on the torque command $\tau_{MG}*$ or the directly given target torque command $\tau M_G*$, a command value Iq* of q-axis current equivalent to torque portion current is calculated in the Iq control means 127. On the other hand, in regard to the command value Id* of d-axis current, a command value Id* minimizing loss is calculated in the Id control means 126 based on the torque command $\tau_{MG}*$ and the rotating speed calculated by the speed calculating means 123. As described above, the motor/generator controller 12 calculates the current command values Iq*, Id* necessary for high efficiency control of the motor/generator 3.

As voltage of the electric power source of the main battery is lowered, measures such as efficiency improvement are taken. For example, each of six bridge elements composing the inverter 4 is composed of a plurality (for instance, 10) of FET elements connected in parallel, and resistance of the bridge element is decreased by making use of resistance characteristic of the FET element to improve the efficiency of the inverter 4. In addition, by increasing the current command values Iq*, Id* and performing phase control, the motor/generator is highly efficiently operated to secure output.

The IdIq detecting means 124 calculates d-, q-axis currents Id, Iq by performing 3-phase/2-phase coordinate transformation on 3-phase alternating current of the motor current detected by the current detector 17. Based on these values and the command values Iq*, Id*, the IdIq current control means 125 performs proportional or proportional integral control processing to calculate voltage command values Vq*, Vd*.

Further, in the 2/3 phase converting means 121, 3-phase alternating current voltage command values VU*, VV*, VW* are calculated by performing 2-phase/3-phase coordinate transformation. The PWM control means 122 generates a PWM signal by performing comparative processing of the voltage command values VU*, VV*, VW* with a carrier wave signal of triangular wave signal. By applying the PWM controlled voltage to the motor/generator 3 as described above, the motor current is controlled to the current command values Iq*, Id*.

Phase angles θ1, θ2 used in the coordinate transformation processing of the 2/3 phase converting means 121, the IdIq detecting means 120 are calculated from outputs of the magnetic pole position detector 16 for outputting a signal having the same phase as an induced voltage of the motor/generator 3 and the encoder 15 for outputting a rotation angle signal (pulse signal).

By performing such processing, the motor/generator 3 is controlled to torque of the torque command $\tau M*$ under a high efficiency and minimum loss condition.

Figure 4:
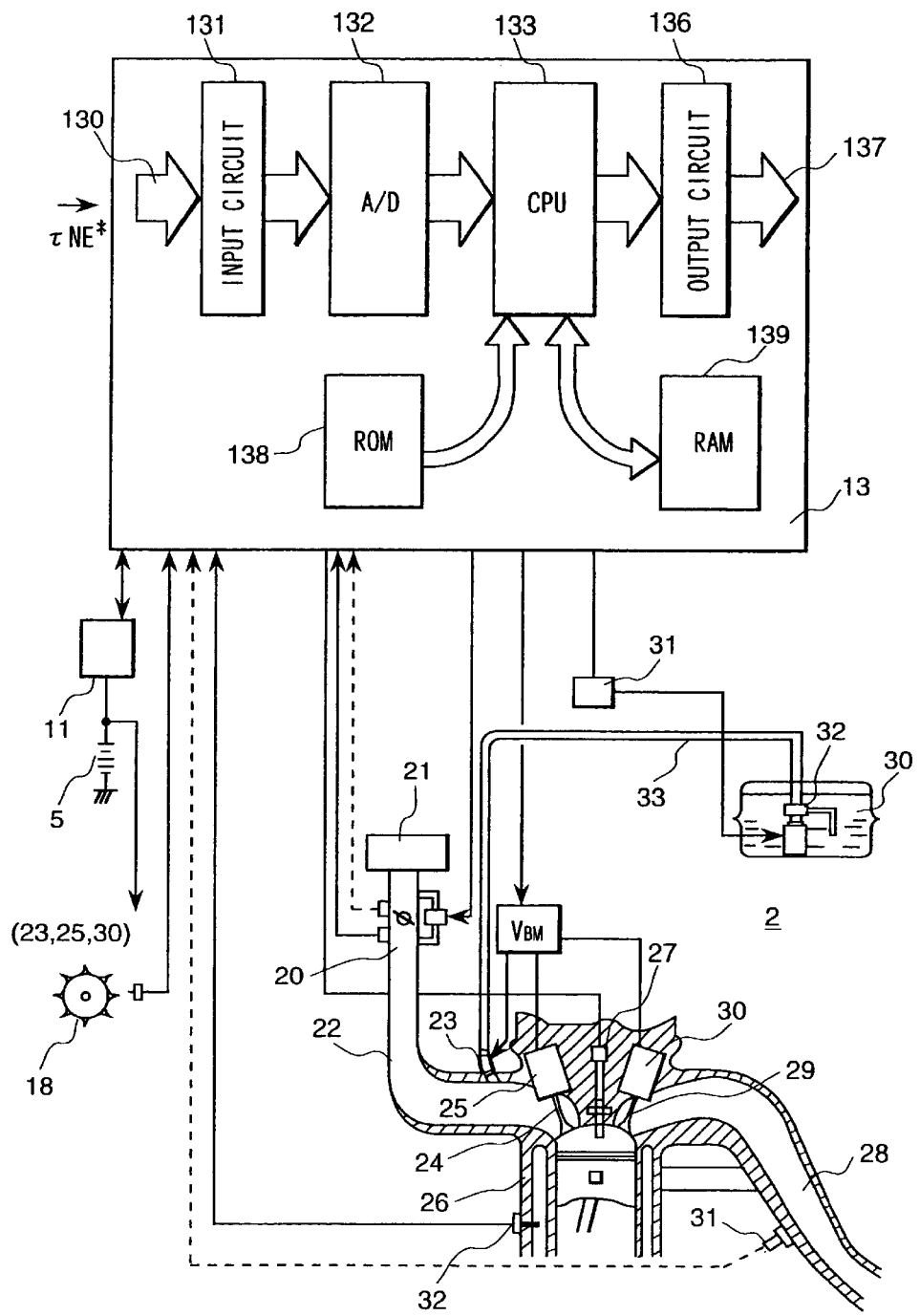
FIG. 4 is a diagram showing an example of the construction of the engine controller of FIG. 2 and an engine controlled by the engine controller.

FIG. 4 shows an example of the construction of the engine controller 13 and an engine controlled by the engine controller 13.

The reference character 20 indicates a throttle valve assembly, that is, a throttle body having a throttle valve for controlling an amount of intake air, and an air cleaner 21 is connected to the inlet side and a plurality of intake air branch pipes 22 for distributing and supplying air to cylinders of the engine are connected to the outlet side. The reference character 23 is an electronic control fuel injection valve attached to the intake air branch pipe 22. An intake valve 24 driven by an electromagnetic valve 25 is provided in the suction side of the engine, and an exhaust valve 29 driven by an electromagnetic valve 30 is provided in the discharge side. An $O_2$ sensor 31 is provided in an exhaust pipe 28. Outputs of a water temperature sensor 32, a cam angle sensor 18, a pressure sensor of the intake air branch pipe 22, a throttle sensor for detecting an opening degree of the throttle valve are input to the engine controller 13, and the engine controller 13 outputs control signals to the fuel injection valve 23, the ignition coil 27, an ISC valve, a fuel pump 32. The reference character 30 is a fuel tank, and fuel is sucked by the fuel pump 32 and transferred to the fuel injection valve 23 after pressure regulated by a pressure regulator through a fuel pipe 33. An appropriate amount of injection fuel of the fuel injection valve 23 is calculated and determined by the engine controller 13 based on inputs from the various kinds of sensors.

The controller 13 is constructed by a computer including an input circuit 131, an A/D converter unit 132, a central calculation unit 133, an ROM 138, an RAM 139 and an output circuit 130. The input circuit 131 receives an input signal 130 (for example, an operation command $\tau_{ME}^*$ or a signal from the cooling water sensor or the throttle opening degree sensor), and removes a noise component from the signal, and outputs the signal to the A/D converter unit 132. The A/D converter unit 132 performs A/D conversion of the signal, and outputs it to the central calculation unit 133. The central calculation unit 133 has a function to execute the above-mentioned control by capturing the A/D conversion result and executing a fuel injection control program or predetermined control programs for the other kinds of control stored in a medium such as the ROM 138.

Calculated results and the A/D conversion result are temporarily stored in the RAM 139, and the calculated results are output as control output signals 137 through the output circuit 136 to be used in control of the fuel injection valve 23, the ignition coil 27, the ISC valve, the electromagnetic valves 25, 30 and the fuel pump 32. Opening and closing timings of the electromagnetic valves 25, 30 are calculated based on an output of the cam angle sensor 18.

The electric power for the fuel injection valve 23, the electromagnetic valve 25 and the electromagnetic valve 30 is supplied from the battery 5.

Figure 5:
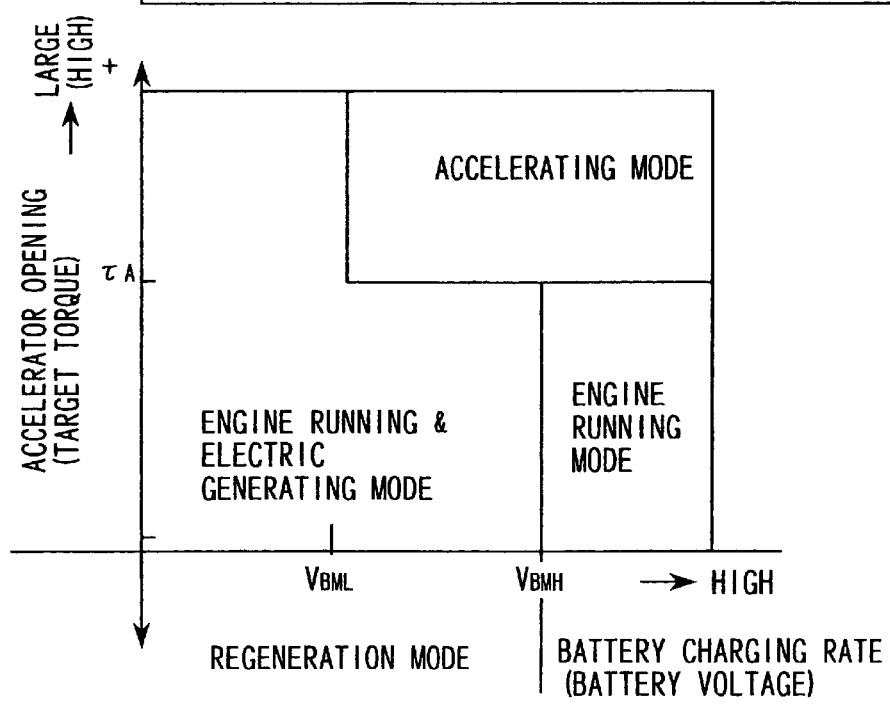
FIG. 5 is diagrams showing an example of operation modes of the system of driving a hybrid vehicle in accordance with the present invention.

The system for driving the hybrid vehicle in accordance with the present invention is driven based on predetermined operation modes, as an example shown in FIG. 5. That is, any one of a plurality of predetermined operation modes is selected based on, for example, an accelerator opening degree or a state of the transmission gear, and running conditions such as a target torque and a vehicle speed are determined, and then an optimum driving source is selected from the viewpoint of reduction of harmful exhaust gas and improvement of fuel consumption. The target torque to be output from the driving system of the vehicle is obtained, for example, from calculation.

As shown in FIG. 5, the operating modes are as follows. One of these is selected depending on ON or OFF state of the accelerator, the clutch of the vehicle.

(1) Start Mode 1

In a case where the key-switch is in ON state and the starter switch is in ON state, the motor/generator is rotated to start up the engine. The operation command $N_{MG^*}$ corresponding to an engine rotating speed of 50 to 100 RPM is output. There, the operation commands are set as $\tau_{NE^*}=0$, $V_{Bs^*}=$OFF, $S_*=$OFF. A starter motor (not shown) may be used instead of the motor/generator.

(2) Start Mode 2

In a case where operation of the engine is stopped with keeping the key-switch in OFF state, and then the accelerator switch is turned on with keeping the clutch in OFF state, the motor/generator or the starter motor is started up. The operation command, $N_{MG^*}$ is the same as in the start mode 1.

(3) Idling Mode

In a case where the key-switch is in ON state, the accelerator switch is in OFF state and the engine stopping mode is not satisfied, the engine is operated in idling rotation. When the charge ratio of the battery is high, the operation command $N_{MG^*}$ corresponding to an engine rotating speed of 600 to 700 RPM is output. There, $\tau_{NE^*}=0$, $V_{Bs^*}=$OFF, $S_*=$OFF. When the charge ratio of the battery is low, for example, the battery voltage $V_{BM}$ is smaller than a preset value, a preset value of $\tau_{NE^*}$ is output ($\tau_{NG^*}>0$), and the motor/generator is rotated to charge the main battery.

(4) Engine Running Mode

In a case where the charge ratio of the main battery does not reach a preset value $V_{BMH}$ (for example, 70%), the motor/generator is used as the generator and the vehicle is run while the battery is being charged. When the accelerator opening degree is large (larger than a target torque TA) and the charge ratio of the main battery is smaller than a preset value $V_{BMS}$ (for example, 40%), an engine running mode is set. At this time, $S_*=$ON, $V_{Bs^*}=$ON. A value $\tau_{NG^*}$ of adding a torque corresponding value for driving the motor/generator to an engine rotating speed corresponding value corresponding to an accelerator opening degree is output. The motor/generator generates 3 kW to 4 kW output at 48 V. The value $\tau_{NE^*}$ is set to a value so that the motor/generator generates a predetermined rated electric power.

(5) Acceleration Mode

In a case where the charge ratio of the main battery exceeds a preset value $V_{BMH}$ and the accelerator opening degree is large (larger than the target torque TA), the engine as well as the motor/generator are used as the power sources for accelerating the vehicle. The operation command is set as $S_*=$ON. The values $\tau_{NG^*}$ and $\tau_{NE^*}$ are determined so that acceleration torque corresponding to the acceleration opening degree is output by the engine and the motor/generator. It is preferable that $V_{Bs^*}=$OFF.

(6) Engine Running Mode

In a case where the charge ratio of the battery exceeds the preset value ($V_{BMH}$) and the accelerator opening degree is not large (smaller than the target torque TA), running only by the engine. The operation command is set as $S_*=$ON. The value $\tau_{NG^*}=0$ and as the value $T_{NE^*}$, an engine rotating speed corresponding value corresponding to an accelerator opening degree is output.

(7) Regeneration Mode

In a case where the key-switch is in ON state, the accelerator switch is in OFF state and a speed of the vehicle is larger than 0 and the charge ratio of the battery does not reach the preset value ($V_{BMH}$), the motor/generator is used as the generator and the vehicle is deceleration running while the battery is being charged. The operation commands are set as $S_*=$ON, $V_{Bs^*}=$ON, and $\tau_{NE^*}=0$. The value $\tau_{NG^*}$ is set to such a negative value that the motor/generator generates a predetermined rated electric power. When the brake switch is in ON state, the brake force is increased by increasing $\tau_{NG^*}$. When the charge ratio of the battery is larger than the preset value, the value $\tau_{NG^*}=0$.

(8) Engine Stop Mode

When any one of the following conditions (a) and (b) is satisfied, operation of the engine is stopped.

(a) The key-switch is in OFF state.

(b) The key-switch is in ON state, the accelerator switch is in OFF state and speed of the vehicle is 0, and the charge ratio of the battery is larger than the preset value (or the battery voltage is higher than the preset value $V_{BMH}$). Further, it is possible to add the condition that a cooling water temperature of the engine is higher than a preset value TS, an inclining angle of the vehicle in a stopping state is smaller than θ and switches of auxiliary components such as air-conditioner and so on are in OFF state.

In the engine stop mode, the operation commands are set as $S_*$=OFF, $V_{Bs^*}$=OFF, $\tau_{NE^*}$=0, $N_{NG^*}$=0.

The reason why the engine stop mode is set is to take into consideration restarting and safety of the vehicle. For example, if the battery voltage is low or the cooling water temperature of the engine is low, the engine is difficult to start up when operation of the engine is restarted after being temporarily stopped. Therefore, when the engine is in a condition not suitable for restarting, idling operation of the engine is continued for a time after the accelerator switch becomes OFF state to charge the batter or to heat up the engine. In a case of temporarily stopping the vehicle on an inclining place, idling operation of the engine is continued to keep necessary torque in order to prevent the vehicle from moving due to its dead weight. Further, when voltage of the auxiliary battery is not high enough to continue operation of the auxiliary equipment such as the air conditioner, idling operation of the engine is continued to secure the necessary power.

Figure 6:
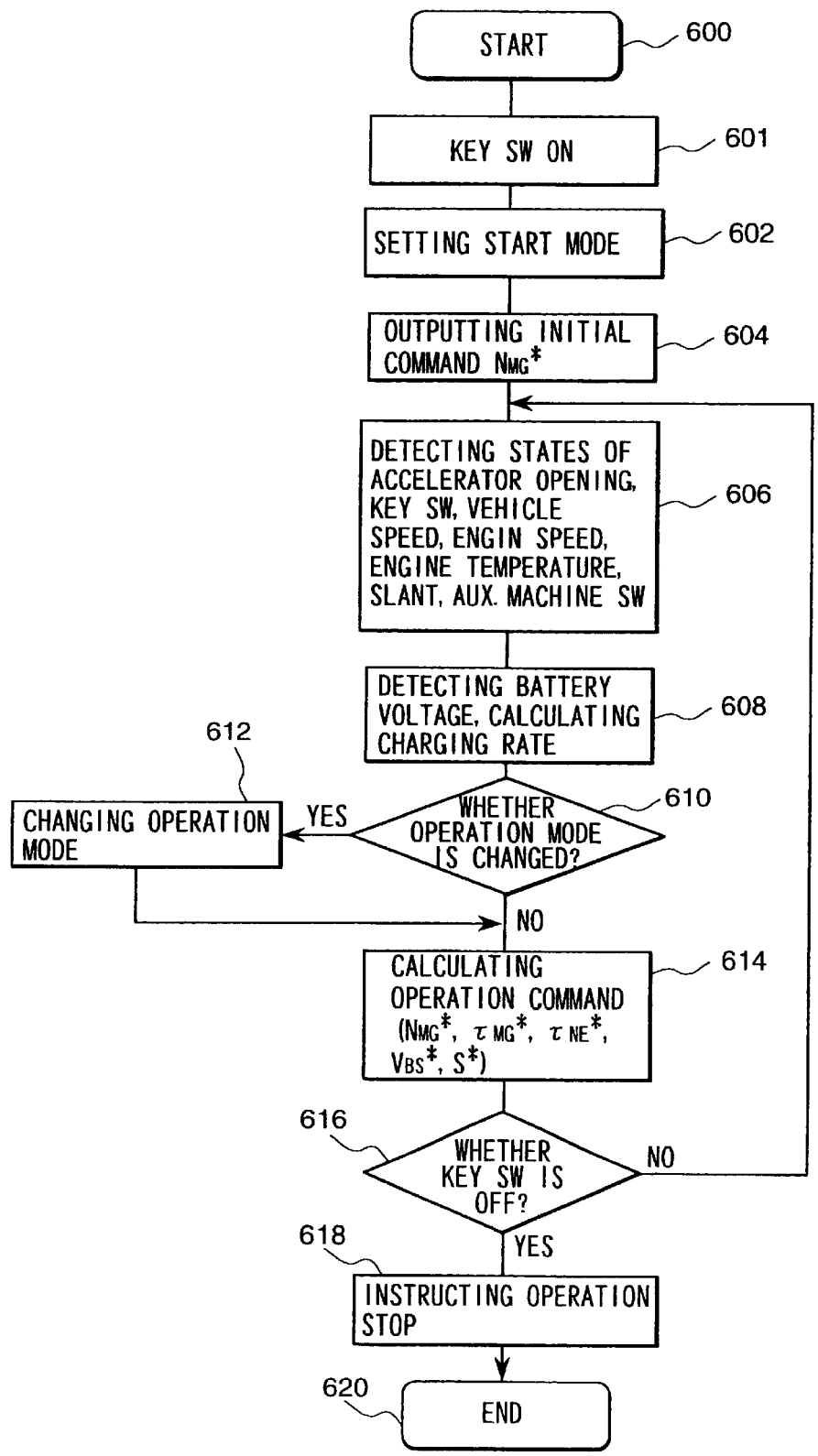
FIG. 6 is a chart showing the outline of operation flow of the controller of FIG. 1.

FIG. 6 is a chart showing the outline of operation flow of the controller 1. When the key switch is in ON state, operation starts with the start mode 1. The start mode 1 is set as initial setting, and an operation command $N_{MG^*}$ of the motor/generator 3 is output to operate only the motor/generator 3 (Step 602, 604). However, when the storage amount (charge ratio) of the battery 5 is smaller than the preset value, measure necessary for secure the storage amount is taken. Then, states of the accelerator opening degree, the clutch, the key switch are sensed. In addition, vehicle speed, engine rotation speed, cooling water temperature of the engine, the inclining sensor, ON and OFF states of switches of the auxiliary equipment are also sensed (Step 606).

Further, storage amounts (charge ratios) of the main battery 5 and the auxiliary battery 6 are calculated from voltages of the batteries (Step 608).

It is judged from the various kinds of detected values whether or not the operation mode needs to be changed (Step 610). If the operation mode needs to be changed, the operation mode is changed (Step 612). Next, the operation commands $N_{MG^*}$ or $\tau_{MG^*}$, $N_{E^*}$, $V_{B^*}$, $S_*$ are calculated based on the detected values according to the set operation mode (Step 614). This processing is repeated until the key switch becomes OFF state. When the key switch becomes OFF state, the operation stop processing is performed (Steps 616, 618).

Figure 7:
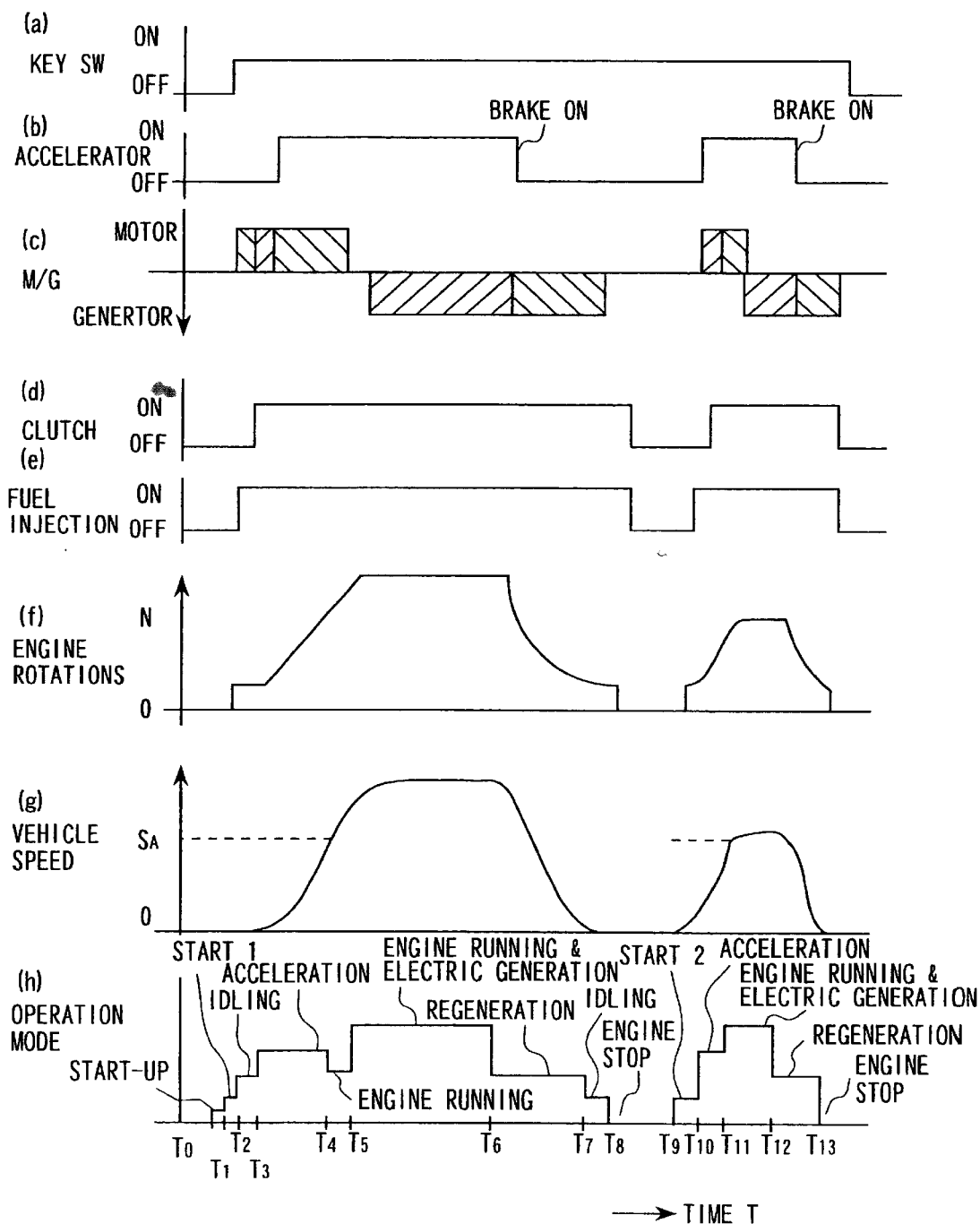
FIG. 7 is charts showing the relationship between operating condition at running and operating state of each of the drive sources by the system of driving the hybrid vehicle of FIG. 1.

FIG. 7 shows an example of the relationship between operating condition at running and operating state of each of the drive sources by the system of driving the hybrid vehicle of FIG. 1. After becoming the start up state by switching the key switch ON state (T0), the engine is started up by using the motor/generator 3 as the engine cranking motor, and fuel injection is started. Further, after the engine is started up and the rotation speed of the engine reaches the idling rotation speed (T2), the clutch 9 is set to ON state to transmit a drive force to the vehicle. When the charge ratio of the battery is low during the idling period, the motor/generator 3 is driven as the generator to charge the battery.

After the accelerator becomes ON state, that is, the accelerator is stepped down (T3), the rotating speed of the engine is increased and the speed of the vehicle is increased corresponding to the accelerator opening degree. In a case where the charge ratio of the battery is high and the accelerator opening degree, that is, the target torque is large, the operation mode becomes the acceleration mode and the motor/generator 3 is driven as the motor by the electric power stored in the battery 5 to assist acceleration of the vehicle.

In a case where the charge ratio of the battery is high and the vehicle speed exceeds the value SA and the accelerator opening degree is relatively small (T4), operation of the motor/generator 3 is stopped and the vehicle is driven only by the engine (the engine operation mode).

In a case where the charge ratio of the battery is low (T5–T6), the operation mode becomes the engine running generating mode and the motor/generator 3 is driven as the generator by excess power of the engine to charge the main battery and the auxiliary battery. When the batteries are sufficiently charged up, operation of the motor/generator 3 is stopped.

After the brake becomes ON state and the accelerator becomes OFF state, that is, stepping of the accelerator is quitted (T6), the vehicle is in a deceleration state. When the charge ratio of the battery is low during deceleration state, the operation mode becomes the regeneration mode and the motor/generator 3 functions as the generator using the inertia energy of the vehicle to recover the electric power to the main battery 5. When the battery is sufficiently charged up, operation of the motor/generator 3 is stopped.

When the speed of the vehicle is decreased to a preset value, for example, to zero in OFF state of the accelerator (T7), it is judged whether or not the engine stop mode is satisfied. In a case where the accelerator switch is in OFF state and the vehicle speed is zero and the battery voltage is higher than the preset value $V_{BS}$ even if the key switch is in ON state, operation of the engine is stopped because the engine stop mode is satisfied. Further, it is possible to add the condition that a cooling water temperature of the engine is higher than a preset value TS, an inclining angle of the vehicle in a stopping state is smaller than θ and switches of auxiliary components such as air-conditioner and so on are in OFF state.

If the engine stop mode is not satisfied at the time T7, the idling mode is continued to maintain rotation of the engine. During that time, when it becomes a state that the engine stop mode is satisfied, for example, when the cooling water temperature of the engine rises up (T8), operation of the engine is stopped.

After stopping of operation of the engine, when the accelerator switch again becomes ON state keeping the key switch in ON state (T9), the engine is started up by the start mode 2 (T10) to perform acceleration operation corresponding to an accelerator opening degree (T12).

When the key switch is turned off (T13), operation of the engine is stopped because the engine stop mode is satisfied.

By appropriately controlling the relation of operating conditions of the driving sources based on charge ratio of the battery and operation condition during running, as described above, it is possible to reduce the exhausted amount of harmful exhaust gas components while reducing of the fuel consumption and the operation characteristic of the whole system of driving the hybrid vehicle are improved.

Assuming that in the example of FIG. 7, the time T6 is a deceleration state before a traffic signal and the time period T7 to T9 is a state of waiting change of a traffic signal light, it is possible to suppress the exhausted amount of harmful exhaust gas by stopping idling operation of the engine during the time period of T8 to T9. Further, since it is taken into consideration to keep the battery voltage and the cooling water temperature of the engine during the time period of T7 to T8, the engine can be smoothly restarted even after operation of the engine is stopped.

Figure 8:
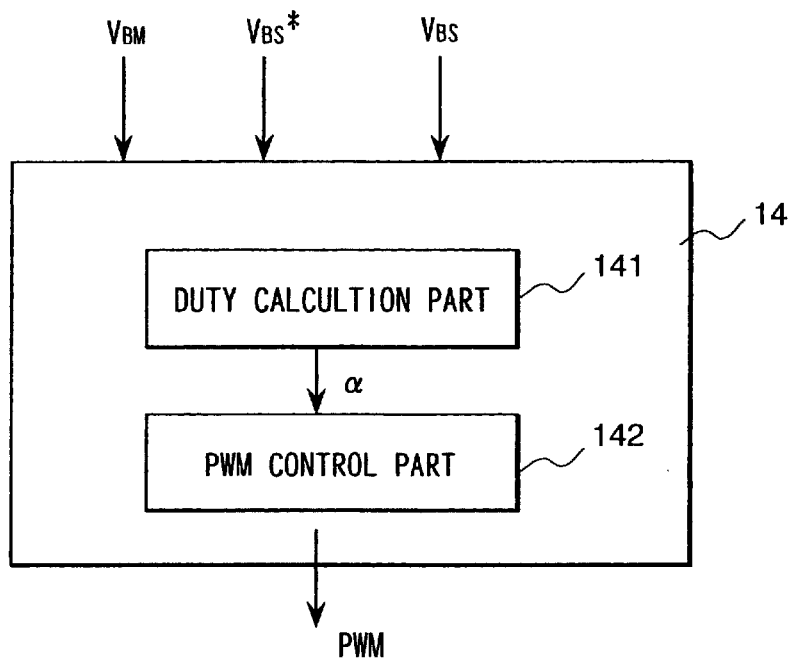
FIG. 8 is a block diagram showing the construction of an example of the auxiliary battery controller of FIG. 2.
Figure 9:
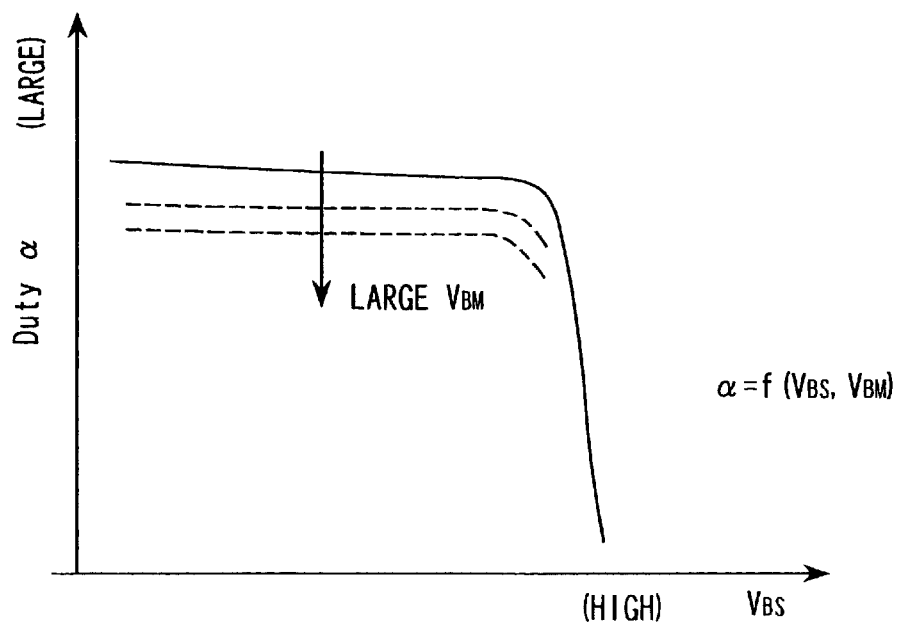
FIG. 9 is a diagram showing the relationship between duty α and voltage $V_{BM}$ of the main battery and voltage $V_{BS}$ of the auxiliary battery.

The auxiliary battery controller 14 comprises a duty calculation part 141 and a PWM control part 142, as shown in FIG. 8. The duty part 141 calculates a duty $\alpha$ from a command $V_{Bs^*}$ having a predetermined relationship with the charge ratio (voltage $V_{BM}$) of the main battery 5 and a voltage $V_{Bs}$ of the auxiliary battery. As the voltage $V_{BM}$) is increased, the duty $\alpha$ is decreased, as shown in FIG. 9. The PWM control part 142 generates a PWM signal corresponding to a duty $\alpha$ and performs chopper control of the switching element 8.

As having been described above, according to the present invention, it is possible to improve the reduction of the fuel consumption and the operation characteristic of the hybrid vehicle. Particularly, since idling operation of the engine is stopped under the predetermined condition when the accelerator switch becomes off state even if the key switch is in ON state, an amount of harmful exhaust gases can be reduced at temporarily stopping of the vehicle by stopping idling operation of the engine for purpose of emission control and the driving operation at temporarily stopping of the vehicle becomes simple, and restarting of the engine and acceleration running after stopping idling operation of the engine can be smoothly performed.

In addition, since the voltage of the main battery is set low, for example, below 60 V, and the ground line being commonly used by the main battery and the auxiliary battery, all the power source lines wired inside the vehicle are positive voltage lines and accordingly the electric power units of the hybrid vehicle can be simplified.

Further, since the high voltage main battery is used for the electric power source of electromagnetic coils for driving the injector and the intake and an exhaust valves of the engine, it is possible to provide a hybrid vehicle which can improve operating characteristics of the engine such as the acceleration performance by improving the operating response of these constituent parts of the engine.

What is claimed is:

1. A power source device for a hybrid vehicle comprising an engine; a motor/generator coupled to said engine; a battery connected to said motor/generator through an electric power converter; and a control unit; wherein:

said battery is constituted by a main battery and an auxiliary battery;

said control unit includes an engine controller for controlling said engine in response to an operating state of said hybrid vehicle and an M/G controller for controlling the motor/generator;

said main battery is controlled by a voltage that is equal to or less than 60 V and higher than a voltage of said auxiliary battery;

said main battery is a power source for driving said motor/generator, an injector of said engine and an intake/exhaust valve;

said main battery is a ground side connected in common with a ground side of said auxiliary battery;

said auxiliary battery is connected to said main battery through a switching element, and is controlled to a voltage of 12V or 24V; and said control unit includes a duty cycle calculation unit for calculating a duty cycle for charging said auxiliary battery based on an instruction voltage from said control unit that is predetermined in response to a charge ratio of said main battery and a voltage of said auxiliary battery, a pulse width modulation control unit for generating a pulse width modulated signal corresponding to said duty cycle, an auxiliary battery controller for controlling said switching element and charging said auxiliary battery from said main battery, and an operation mode discriminating and processing unit having an engine running electric generating mode in which the battery is charged with the motor/generator being applied as an electrical power generator when the charge ratio of said main battery is less than a predetermined value, and having an engine running mode in which only said engine is operated when the charge ratio of said main battery exceeds a predetermined value and is less than a target torque.

* * * * *